United States Patent [19]

Meiers

[11] 4,150,527
[45] Apr. 24, 1979

[54] MACHINE FOR FORMING CYLINDRICAL HAY BALES

[75] Inventor: Gerald F. Meiers, Ottumwa, Iowa

[73] Assignee: Deere & Company, Moline, Ill.

[21] Appl. No.: 812,646

[22] Filed: Jul. 5, 1977

[51] Int. Cl.$^2$ ............................................ A01D 43/02
[52] U.S. Cl. ........................................ 56/341; 100/88
[58] Field of Search ................. 56/341, 342, 343, 344, 56/345, 346; 100/88

[56] References Cited

U.S. PATENT DOCUMENTS

| | | | |
|---|---|---|---|
| 2,627,223 | 2/1953 | Berge | 100/88 |
| 2,705,915 | 4/1955 | Olson et al. | 100/88 |
| 3,894,484 | 7/1975 | Anstey | 56/341 |
| 3,931,702 | 1/1976 | Soteropulos et al. | 56/341 |
| 3,992,987 | 11/1976 | Sereg | 100/88 |
| 4,077,315 | 3/1978 | Meiers | 56/341 |

Primary Examiner—Louis G. Mancene
Assistant Examiner—Paul J. Hirsch

[57] ABSTRACT

A machine for forming large round bales of hay and the like has a pickup mechanism that removes the crop from the field and delivers it rearwardly between a pair of compresser rolls, which deliver crop material in a mat to a baling zone between upper and lower endless conveyors. The upper conveyor includes a plurality of endless belts trained around a plurality of transverse rollers, one of which is disposed adjacent the rearward end of the lower conveyor and is mounted on a rear gate assembly that is swingable upward and rearwardly to permit discharge of the bale from the baling chamber. As the bale increases in size, its center of gravity moves rearwardly and after its initial stage of formation, it is partially supported on the roller adjacent the lower conveyor, said roller being disposed generally below the center of the bale when the bale reaches full size. An auxiliary roller is provided on the rear gate assembly immediately adjacent to said main bale support roller to help support the underside of the bale and thereby reduce the penetration of the roller into the periphery of the bale, the auxiliary supporting roller being vertically adjustable relative to the main support roller to selectively vary the amount of load carried by the main support roller and thereby selectively vary the rolling resistance caused by the penetration of the main support roller into the bale periphery.

2 Claims, 2 Drawing Figures

MACHINE FOR FORMING CYLINDRICAL HAY BALES

BACKGROUND OF THE INVENTION

This invention relates to a machine for forming cylindrical bales of crop material, such as hay and the like, and more particularly to an improved machine of the above general type wherein the bale is formed off the ground. A machine of the above general type is shown in U.S. Pat. No. 3,931,702, which is also assigned to the assignee of the present application. In the machine described in said patent, the bale is supported from below on a lower conveyor during its entire formation, the bale being formed between the rearwardly moving upper run of the lower conveyor and the forwardly moving lower run of an upper conveyor. The upper conveyor includes a lower rear roller about which a plurality of side by side belts are trained, said roller being mounted on a rear gate assembly that swings rearwardly and upwardly so that the roller clears a fully formed bale to permit rearward discharge of the bale from the machine.

To reduce the cost of the machine, such balers have been provided with much shorter lower conveyors, wherein the rearward end of the lower conveyor is generally below the center of a fully formed bale, the lower rear roller that is mounted on the rear gate assembly of such machines being disposed immediately to the rear of the rearward end of the lower conveyor, thereby substantially supporting the weight of the bale after it reaches a certain size. In certain machines of the above general type, the lower conveyor is formed by a series of rollers, such as schematically shown in U.S. Pat. No. 3,992,987, while in other machines the lower conveyor is formed by a belt trained around a number of rollers, although in both cases, the weight of the bale is supported on the lower rear roller of the upper conveyor after the initial stages of the bale formation.

Typically, the diameter of the lower rear roller is about four inches, and the relatively small diameter of the roller as compared to the diameter of the fully formed bale, which approximates six foot in diameter, causes a penetration or depression in the periphery of the bale at the point of engagement with the roller. This deformation of the roll periphery travels around the periphery as the bale rotates and creates a significant resistance to the rolling of the bale. The resistance to rolling, of course, requires power to overcome, and the more power necessary to rotate the bale the greater the amount of tension in the belts of the upper conveyor, which engage the bale and turn the bale. Since the density of the bale is affected by the tension in the belts of the upper conveyor, which substantially envelop the bale, the increased belt tension and rolling resistance due to the penetration of the bale by the lower rear support roller have increased the bale density as well as significantly increasing the power required to operate the baler. While in some crop materials, such as lighter and dryer grasses, the rolling resistance created by the roller penetration have in fact been advantageous since it increased the bale density, in more dense crop materials, such as alfalfa having a higher moisture content, the rolling resistance due to the penetration of the bale has raised the power requirement and bale density to undesirable levels, the tension of the belts in some cases reaching a level wherein belt damage or fracture occurs.

SUMMARY OF THE INVENTION

According to the present invention, means are provided on a baler of the above general type, wherein a fully formed bale is at least partially supported on one of the rollers of the upper conveyor system, for reducing the rolling resistance of the bale and consequently the power required to operate the baler. More specifically, an auxiliary roller is provided parallel and adjacent to the main support roller to help carry the weight of the bale and thereby reduce the deformation or penetration of the support rollers into the bale. It has been found that provision of such an auxiliary roller significantly reduces the power required to operate the baler in some crops and crop conditions and also decreases the bale density to a more desirable range.

An important feature of the invention resides in the provision of means for adjusting the position of the auxiliary roller relative to the main support roller so that the amount of support provided by the auxiliary roller can be varied. Thus, in lighter crop materials, where a greater rolling resistance is desirable to increase bale density, the auxiliary roller can be adjusted to decrease the amount of support it provides. Conversely, in more dense crop material, where there is no problem in obtaining adequate bale density but there is no problem with excessive power consumption and density, the auxiliary roller can be adjusted so that it shares the support of the bale with the main support roller to reduce the bale deformation and rolling resistance.

Another advantage of the invention is its simple and inexpensive construction, which can be provided on new balers or easily added to balers already in the field.

DESCRIPTION OF THE PREFERRED EMBODIMENT

Figure 1:
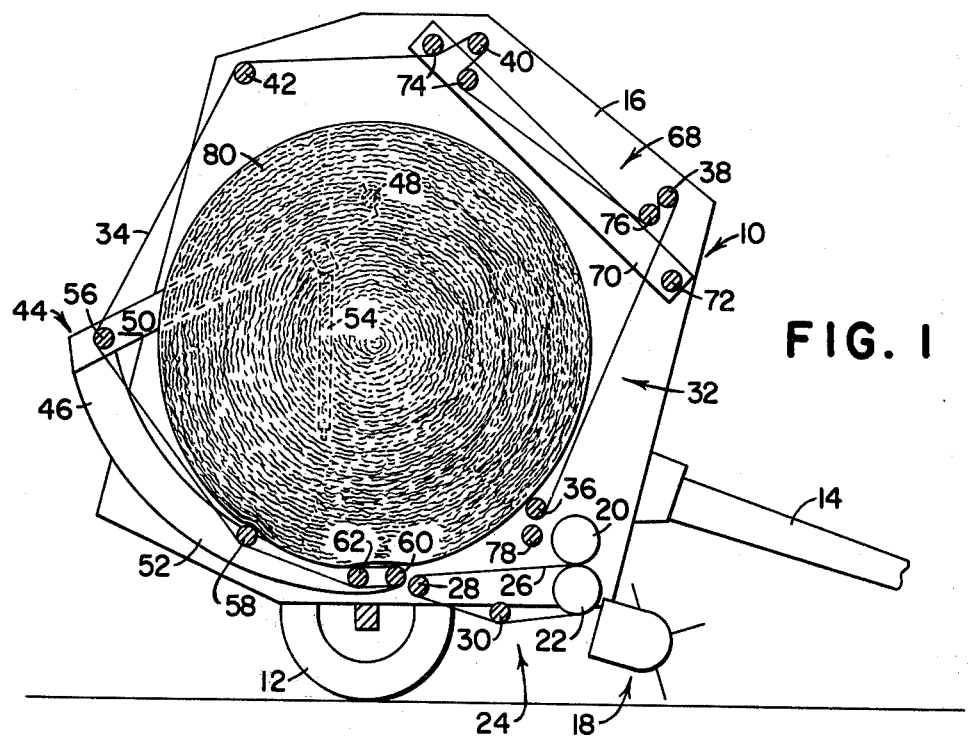
FIG. 1 is a schematic, fore and aft, vertical section of a baler embodying the invention with a fully formed bale in the machine.

The invention is embodied in a large round baler that includes a mobile main frame, indicated in its entirety by the numeral 10, the main frame being mounted on a pair of laterally spaced wheels 12 and being connected to and towed by a tractor (not shown) through a forwardly extending implement tongue 14 that forms a part of the main frame. The main frame also includes a pair of opposite, upright, fore and aft sides 16 at opposite sides of the machine, only the left side being shown in the drawings, since FIG. 1 is a schematic vertical fore and aft section of the machine, the right side being substantially identical to the left side of the machine shown in the drawing. The opposite sides 16 form a relatively large chamber in which the bale is formed.

Mounted at the forward end of the main frame is a pickup mechanism, which operates to raise crop material from a windrow in the field as the machine advances and deliver it upwardly and rearwardly between a pair of compression rolls 20 and 22, which compress the crop material into a mat and deliver the mat rearwardly onto the upper run of a belt-type lower conveyor 24. The conveyor 24 includes a single belt 26 that spans the width of the machine between the opposite sides 16 and is trained around a transverse rear roller 28 and the lower compression roller 22 as well as a belt tensioning idler 30.

An upper belt-type conveyor 32 is also disposed between the opposite side 16 and includes a plurality of endless flexible belts 34 disposed side by side across the width of the baling chamber between the opposite sides 16. The belts 34 are trained around a lower front transverse roller 36 journaled in and extending between the opposite sides and disposed adjacent to and rearwardly of the upper compression roll 20. The belts are also trained around a front upper roller 38, a center upper roller 40, and a rear upper roller 42, all of which extend transversely between the opposite frame sides and are journaled therein.

The main frame also includes a rear gate assembly, indicated generally by the numeral 44. The gate assembly 44 includes a pair of L-shaped arms 46 at opposite sides of the machine and swingably mounted on pivots 48 at the upper forward ends of the arms for swinging between a closed operating position, as shown in FIG. 1, and a raised discharge position, wherein it permits the rearward discharge of a bale from the baling chamber. Each arm 46 includes an upper arm portion 50 connected to the pivot 48 and an arcuate lower arm portion 52 that is rigidly attached to and extends downwardly and forwardly from the rearward end of the upper arm portion 50. A pair of hydraulic cylinders 54 have their lower ends connected to the main frame (not shown) and their upper ends connected to the upper arm portions 50 to swing the rear gate assembly between its closed or operating condition as shown and its raised discharge position. All of the above represent more or less known baler construction and is generally shown in said U.S. Pat. No. 3,931,702, although the rear gate assembly in said patent is formed by articulating arms rather than the rigid arms shown herein, and the lower conveyor shown herein is somewhat shorter than the lower conveyor shown in said patent.

A rear transverse roller 56 extends between the rearward ends of the upper arm portions 50, an intermediate rear roller 58 extends between the central area of the lower arm portions 52 and a lower rear roller or main bale support roller 60 extends transversely between the forward ends of the lower arm portions 52 and is disposed immediately to the rear of and adjacent to the rear roller 28 of the lower conveyor when the rear gate assembly 44 is in its closed position. An auxiliary support roller 62 also extends between the lower arm portions 52 parallel and immediately to the rear of the main bale support roller 60. The auxiliary roller is mounted on the rear gate assembly for adjustment into alternate vertical positions, the adjustable mounting means in the illustrated embodiment being somewhat schematically shown as a roller shaft 64 extending through a plurality of vertically spaced alternate mounting holes 66 in the lower arm portions 52, the roller being shown in its uppermost position in FIG. 2. As is well known, the roller 62 and the other rollers in the machine, are mounted in suitable bearings that are not shown in the drawings, the bearings for the roller 62 being adjustable on the gate assembly arms. In the illustrated embodiment, the rollers 60 and 62 are approximately 3 ½ inches in diameter and are spaced approximately 8 inches apart on center, so that there is roughly a 5 inch gap between the two rollers. In the uppermost position of the auxiliary roller, the top of the roller 62 is slightly above the level of the top of the main support roller 60, and the roller 62 is adjustable so that its top is approximately 2 inches below the level of the top of the main roller 60 in the lowermost position.

The belts 34 are also trained around the rollers 56, 58, 60 and 62, the belts moving from the roller 60 to the roller 36. The lower runs of the belts between the rollers 60 and 36 are expandable into a loop that defines the baling zone of the machine, the loop expanding as the bale grows in size.

To accommodate the growing bale, a belt tensioning and take-up mechanism 68 is provided, the mechanism being of well-known construction and comprising a pair of arms 70 pivotally mounted at 72 on the opposite frame sides and carrying a pair of idler rollers 74 at its rearward end, the idlers 74 engaging the upper surfaces of the belts on opposite sides of the center top roller 40 and moving upwardly as the bale increases in size to reduce the loops on the opposite sides of the roller 40 to accommodate the added length of belt necessary in the baling zone. As is well known, springs (not shown) are provided to bias the arms 70 downwardly to provide tension in the belts 34.

The belts 34 can be driven by any conventional drive system connected to one or more of the rollers, it being contemplated that the roller 38 being a drive roller in the illustrated embodiment with an idler roller 76 being provided to increase the belt wrappage on the roller 38. The drive system is conventionally connected to the tractor power take-off and is driven thereby. A stripper roller 78 is provided below the lower front roller 36 and rearwardly adjacent to the upper compression roll 20 to strip material from the belts as the belts leave the baling zone.

In operation, as the machine advances, the pickup 18 delivers crop material to the oppositely rotating rolls 20 and 22 which deliver the crop in a mat on top of the upper run of the lower conveyor 24. As the mat of material moves rearwardly along the upper run of the conveyor 24, it is engaged by the lower run of the upper conveyor 32, the belts 34 engaging the crop material as the belts move forwardly from the roller 60 toward the roller 36. The mat of crop material thus is turned forwardly and tends to roll in spiral fashion in the baling zone between the lower run of the upper conveyor 32 and the upper run of the lower conveyor 24. As material continues to feed into the baling zone, the bale grows in size, and the lower run of the conveyor 32 between the rollers 60 and 36 forms into an increasingly large loop that envelopes the bale, which is indicated by the numeral 80 in the drawings. Initially the bale is supported on the upper run of the conveyor 24, but as it grows, its center of gravity moves rearwardly, and an increasingly greater amount of the bale is supported on the roller 60. The machine in the illustrated embodiment is designed to make an approximately 6 foot diameter bale, and by the time a bale reaches 4 foot in diameter, a substantial portion of the weight is supported on the roller 60.

Figure 2:
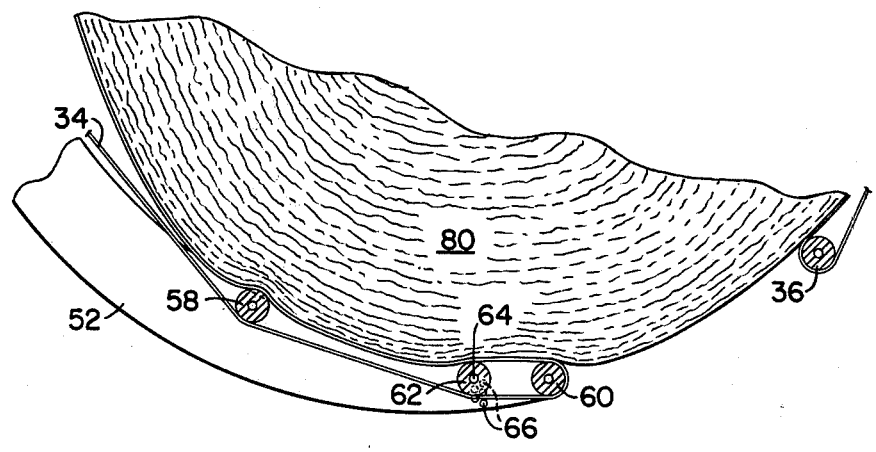
FIG. 2 is an enlarged vertical fore and aft section through the bottom portion of the bale and the rear gate assembly supporting the bale.

Since the crop material is compressible, the bale deforms somewhat at its support points, the roller 60 causing an indentation or penetration of the bale periphery where it engages the bale. Since the bale is being rotated, the deformation on the periphery moves around the bale periphery and causes a resistance to the rolling of the bale. As previously described, the rolling force is imparted through the belts 34, and the greater the resistance to rolling, the greater the tension in the belts 34. While the belt tensioning and take-up mechanism 68 provides a minimum amount of tension, the resistance to rolling of the bale adds belt tension. In heavy, higher moisture crop material, where it is not difficult to obtain sufficient bale density, the increased belt tension and accompanying bale density as the result of the rolling resistance produces a bale that is too dense and requires an excessive amount of power to form the bale. However, when the auxiliary roller 62 is positioned in its uppermost position, as shown in FIG. 2, it helps support the bale and reduces the weight supported on the main support roller 60, thereby reducing the deformation of the bale, since the unit pressure on the roller is reduced. When the bale is fully formed, the center of the bale is approximately directly above the roller 60. In dense material, the excessive rolling resistance can occur after the bale reaches approximately 4 feet in diameter, at which time the center of the bale is forwardly of the roller 60. For the rollers 60 and 62 to provide equal support for the bale, the tops of the rollers should be approximately the same distance from the center of the bale, but since the center of the bale shifts rearwardly as it grows, it is impossible to have the rollers 60 and 62 at exactly the same distance from the bale center during the entire period when the added support is desirable, when the bale is between 4 and 6 feet in diameter. As a compromise, the roller 62 is located in its uppermost position so that it is the same distance from the center of a 5 foot bale as the roller 60, so that the top of the roller 62 is slightly above the level of the top of the roller 60. It has been found that the added support provided by the auxiliary roller 62 significantly reduces the rolling resistance of the bale in the latter stages of its formation, thereby reducing the power requirements to operate the machine, as well as reducing the bale density to a desired level and reducing the stress of the belts 34.

In lighter material, such as dry grasses that are encountered in some areas of the country, the problem is not excessive belt tension and bale density, but rather insufficient bale density. In such a case, the rolling resistance as the result of the penetration of the support roller 60 into the bale and the resulting increased belt tension and belt density are desirable. Therefore, the auxiliary roller would be adjusted to a lower position, wherein it would not significantly help support the bale, allowing maximum bale penetration by the roller 60 and maximum bale density. The intermediate positions of the roller 62 between the uppermost and lowermost positions, allow the operator to match the lessening of the bale density, as a result of the engagement of the bale by the roller 62, to the particular crop being baled. Thus, the positioning of the roller 62, in addition to solving the problem of excessive bale density, gives the operator some degree of control over the density of the bale and the power required to form the bale.

I claim:

1. In a machine for forming cylindrical bales of crop material and having a mobile frame including a shiftable gate assembly and opposite upright sides forming a baling chamber therebetween, a plurality of transverse rollers including a first roller carried by the gate assembly and a second roller spaced forwardly of the first roller, an endless belt means trained around the rollers and having a lower forwardly moving bale engaging run in the baling chamber between the first and second rollers, crop delivery means for removing crop material from the ground and delivering it to the baling chamber so that it is engaged by the bale engaging run of the belt means and rolled in spiral fashion into a cylindrical bale with the first roller disposed below and at least partially supporting the weight of the bale at least in the latter stages of its formation, the improvement comprising:

an auxiliary roller; and adjustable mounting means rotatably supporting the auxiliary roller on the rear gate assembly parallel and rearwardly proximate to the first roller for adjustment of the auxiliary roller between an upper position, wherein the top of the roller is at approximately the same level as the first roller and substantially helps to support the bale, and a lower position, wherein the top of the roller is substantially below the level of the top of the first roller and provides a lesser amount of support for the bale, the auxiliary roller being spaced in a fore and aft direction from the roller a distance than less twice the diameter of the first roller and being disposed so that the auxiliary roller supports a portion of the weight of the bale at least in the latter stages of bale formation.

2. In a machine for forming cylindrical bales of crop material and having a mobile frame including a rear gate assembly shiftable between a raised bale discharge position and a lowered baling position, a baling chamber, means for removing crop material from the ground and delivering it to the baling chamber, and conveyor means defining the periphery of the baling chamber and adapted to receive crop material from the crop delivery means and roll it into a spiral cylindrical bale, the conveyor means including a first support roller rotatably carried by the rear gate assembly axially parallel to the bale axis and adapted to at least partially support the underside of a bale in the baling chamber at least after it reaches a predetermined size, the improvement comprising:

an auxiliary roller; an adjustable support means rotatably mounting the auxiliary roller on the rear gate assembly adjacent and parallel to the first support roller generally below the axis of a fully formed bale for adjustment between a first position, wherein it also partially supports the underside of a bale in the baling chamber at least after it reaches a predetermined size, and a second position, wherein it is disposed away from the bale axis a greater distance than the first support roller and provides a lesser amount of support for the bale, the auxiliary roller having its top surface at generally the same level as the top surface of the first support roller in its first position and below the level of the top surface of the first support roller in its second position.

* * * * *